United States Patent [19]

Haage et al.

[11] Patent Number: 5,634,752
[45] Date of Patent: Jun. 3, 1997

[54] ANCHOR BOLT FOR ANCHORING BY COMPOUND MASS, AND METHOD OF MANUFACTURING THE SAME

[75] Inventors: Manfred Haage, Dornstetten; Guenter Seibold, Pfalzgrafenweiler; Bernd Plocher, Rottenburg; Bernd Hein, Freudenstadt; Wilfried Weber, Schopfloch, all of Germany

[73] Assignee: fischerwerke Artur Fischer GmbH & Co. KG, Waldachtal, Germany

[21] Appl. No.: 383,018

[22] Filed: Feb. 2, 1995

[30] Foreign Application Priority Data

Feb. 2, 1994 [DE] Germany .................... 44 03 131.9

[51] Int. Cl.$^6$ ..................... F16B 39/00; F16B 39/02
[52] U.S. Cl. ..................... 411/82; 411/258; 411/930; 405/259.5
[58] Field of Search ..................... 411/107, 82, 258, 411/930, 421, 902, 903; 405/259.5, 259.6; 419/66, 68

[56] References Cited

U.S. PATENT DOCUMENTS

| | | | |
|---|---|---|---|
| 2,667,037 | 1/1954 | Thomas et al. | 405/259.5 |
| 3,047,036 | 7/1962 | Waltermere . | |
| 4,206,060 | 6/1980 | Yamamoto et al. | 411/902 X |
| 4,393,638 | 7/1983 | Sell et al. | 405/259.6 |
| 4,815,909 | 3/1989 | Simons | 411/421 X |
| 5,054,146 | 10/1991 | Wiesenfeld et al. | 495/259.6 |
| 5,222,850 | 6/1993 | Medal | 411/82 |
| 5,234,291 | 8/1993 | Swemmer | 411/421 X |
| 5,273,377 | 12/1993 | Taylor | 405/259.5 |

FOREIGN PATENT DOCUMENTS

| | | |
|---|---|---|
| 368254 | 10/1979 | Austria . |
| 1270437 | 10/1960 | France . |
| 818140 | 10/1951 | Germany . |
| 2556493 | 12/1975 | Germany . |
| 4017032 | 5/1990 | Germany . |
| 4137090 | 11/1991 | Germany . |
| 124959 | 3/1928 | Switzerland . |
| 2169050 | 7/1986 | United Kingdom . |

OTHER PUBLICATIONS

Mayer, "Polytetrafluororaethylen—ein vielseitiger Werkstoff", Coating Aug. 1978, pp. 259–261 and 271.

Primary Examiner—Neill R. Wilson
Attorney, Agent, or Firm—Michael J. Striker

[57] ABSTRACT

An anchor bolt has locking elements arranged over a part of the outer surface and formed as radially projecting lugs which are spaced circumferentially and axially from one another. Therefore a good mixing of a compound mass and reduction of the driving-in resistance is obtained. Therefore the outer diameter measured over the lugs of the anchor bolt can be matched approximately to the diameter of the drilled hole. Simple and inexpensive manufacture of the anchor bolt can be provided by powdered metal injection molding method using a system of binders with subsequent removal of the binders and sintering.

5 Claims, 1 Drawing Sheet

ANCHOR BOLT FOR ANCHORING BY COMPOUND MASS, AND METHOD OF MANUFACTURING THE SAME

BACKGROUND OF THE INVENTION

The present invention relates to an anchor bolt for anchoring by means of a compound mass in a hole drilled in a component, and also to a method for manufacturing such anchor bolt.

Anchor bolts for anchoring by means of a compound mass in a hole drilled in a component are usually formed as threaded rods having a leading end with a tapered point and a rear end with a driver member. The threaded rod is driven by a hammer drill into a drilled hole into which the compound mass has been introduced by a cartridge or a glass capsule. The tapered point crashes the glass capsule and at the same time mixes the compound mass comprising two components in the drilled hole. The threads of the anchor bolt provide a good bond between the compound mass and the anchor bolt. However, the crests of the thread make it difficult for the compound mass to rise along the outer surface of the anchor bolt. For reducing the high driving-in resistance caused by this, the gap between the outer diameter of the anchor bolt and the wall of the drilled hole must be chosen to be satisfactorily large. This requires more effort in drilling and a larger volume of compound mass. Moreover, in order to achieve satisfactory mixing of the components in the drilled hole, the anchor bolt has to be rotated for a considerable time, thus necessitating more efforts in assembly.

SUMMARY OF THE INVENTION

Accordingly, it is an object of the present invention to produce an anchor bolt for compound mortar fixing, and the method of manufacturing the same which avoids the disadvantages of the prior art.

In keeping with these objects and with others which will become apparent hereinafter, one feature of the present invention resides, briefly stated, in an anchor bolt having locking elements arranged over a part of its outer surface, for anchoring by means of a compound mass in a hole drilled in a component, and having a thread at its rear end for fixing the article, wherein in accordance with the present invention the locking elements are formed as radially projecting lugs which are arranged circumferentially, axially spaced from one another, on the outer surface of the anchor bolt.

In accordance with another feature of the present invention a method of manufacturing of the anchor bolt is proposed, in accordance with which the anchor bolt is manufactured from powdered metal in an injection molding operation using a system of binders, with subsequent removal of the binders and sintering.

When the anchor bolt is designed and the method is performed in accordance with the present invention, an anchor bolt for compound mortar fixing is produced which, combined with high holding values and short hardening times, can be anchored in a relatively short time by virtue of good mixing of the compound mass, and can be manufactured in a simple manner.

The radially projecting lugs arranged circumferentially, axially spaced from one another on the outer surface of the anchor bolt provide interconnected spaces between the outer surface of the anchor bolt and the wall of the drilled hole in which the compound mass can rise as the anchor bolt is driven in. The compound mass builds up at the leading front face of the lugs as it rises, so that by flowing around the lugs the components of the compound mass are mixed well. The diameter of the anchor bolt, measured over the lugs, can correspond approximately to the diameter of the drilled hole. Driving in the anchor bolt can be effected both with and without rotation.

In accordance with a further feature of the present invention, an even better mixing of the compound mass can be effected by arranging the lugs so that they are offset axially with respect to one another, so that a subsequent lug is aligned in each case with the gap formed by the two preceding lugs.

In order to reduce the resistance to driving-in, it is furthermore provided in accordance with the present invention that the front end face of the lugs is in the form of tapered point.

For achieving an expansion effect when the drilled hole widens as a result of crack formation and the anchoring bolt slides up, the lugs can have a slope which is inclined axially towards their rear end. This subsequent expansion effect can be further encouraged by providing the entire anchor bolt with a coating that reduces adhesion of the compound mass to the anchor bolt. When the drilled hole widens, the compound mass thus detaches itself from the anchor bolt a little so that, as a result of the anchor bolt's sliding up, the slope arranged on the lugs again engages the inclined surfaces molded in the compound mass.

In accordance with a still further feature of the present invention, scraper edges can be formed on the lugs to clear drilling dust from the wall of the drilled hole.

When the anchoring bolt is to be driven into the drilled hole predominantly by rotation, the lugs can be arranged helically on the outer surface of the anchor bolt and aligned in accordance with the helix angle. For machine placement of the anchor bolt, the anchor bolt may have a driver element, preferably in the form of a multi-faced head, at its rear end.

As specified hereinabove, the anchor bolt of the present invention can be manufactured simply and in inexpensively by means of the metal injection-molding method. In accordance with this method, the anchor bolt is manufactured from powdered metal in an injection molding operation with the use of a system of binders which are subsequently removed, and sintering.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
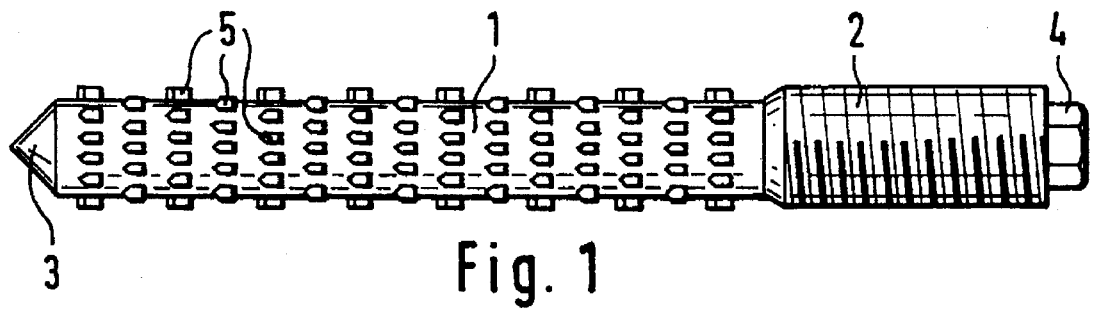
FIG. 1 is a view showing an anchor bolt in accordance with the present invention.

An anchor bolt 1 in accordance with the present invention is shown in FIG. 1. It has a rear end provided with a thread 2 for fixing an article and a leading end provided with a pointed tip 3 for facilitating crushing of a glass capsule and facilitating displacement of the compound mass. A driver member 4 formed as an external multi-face head is arranged at the rear end of the anchor bolt 1. It is used for driving the anchor bolt 1 by a machine using a hammer drill, with or without the rotary action. The outer surface of the anchor bolt 1 is provided with radially projecting lugs 5. The lugs are arranged circumferentially and axially spaced from one another.

Figure 2:
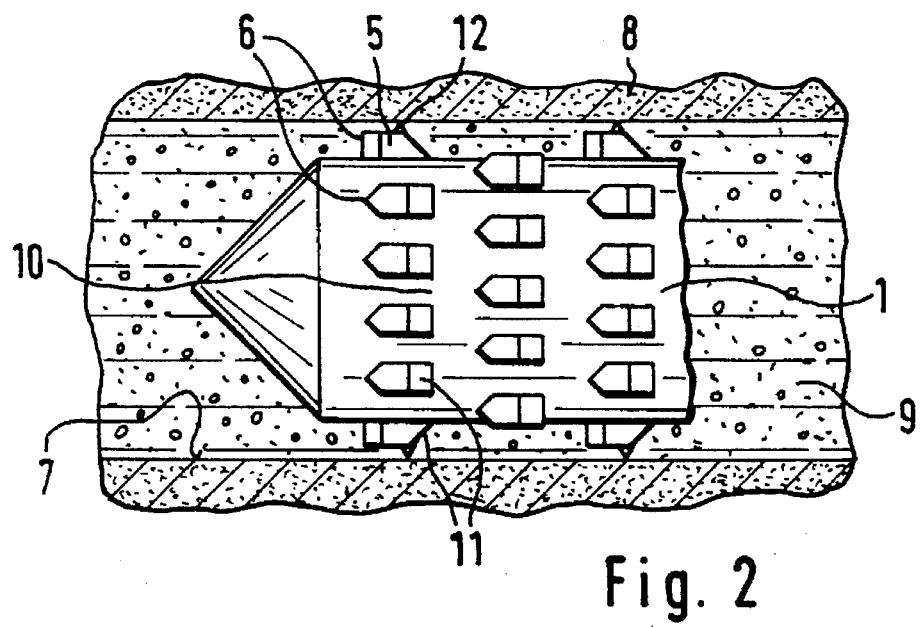
FIG. 2 is a view showing the anchor bolt of the invention inserted in the drilled hole, on an enlarged scale.

As can be seen from FIG. 2, the leading front face of the lug 5 forms a tapered point 6. The tapered point reduces the driving-in resistance as the anchor bolt is driven into the drilled hole 7 of the component 8. In order to improve mixing of the compound mass 9, the lugs 5 can be arranged offset axially with respect to one another so that a subsequent lug 5' is aligned in each case with the gap 10 formed by the two preceding lugs. For achieving a radial force component toward the wall of the drilled hole, when the anchor bolt is loaded, the lugs 5 have a slope 11 inclining axially toward the rear end.

Figure 3:
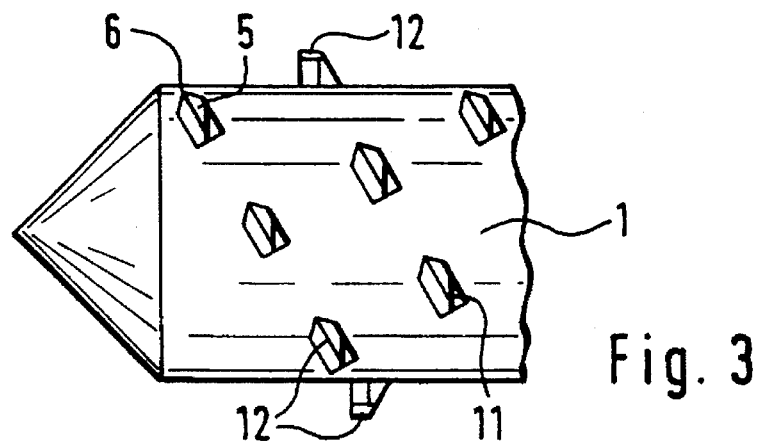
FIG. 3 is a view showing the inventive anchor bolt with helically arranged lugs.

In accordance with another embodiment shown in FIG. 3, the lugs 5 are arranged helically on the outer surface of the anchor bolt. They are aligned with their point 6 and their longitudinal edges correspond to the helix angle. Only the slope 11 arranged on the lug 5 is formed so that it slopes down axially.

As can be seen from FIGS. 2 and 3, a scraper edge 12 (performing a scraping action) can be arranged on the lug 5. The orientation of the scraper edge 12 in the longitudinal direction of the lug 5 is advisable when the lugs are arranged helically and driven into the drilled hole with a rotary action. For the anchor bolt shown in FIG. 2 which is to be driven in mainly without a rotary action, the scraper edge 12 is arranged transversely to the longitudinal direction of the lug 5.

The outer surface of the anchor bolt can also be coated with a non-stick agent.

It will be understood that each of the elements described above, or two or more together, may also find a useful application in other types of constructions differing from the types described above.

While the invention has been illustrated and described as embodied in an anchor bolt for anchoring by compound mass, and method of manufacturing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An anchor bolt for anchoring by a compound mass in a hole drilled in a component, comprising a body having an axis and an outer surface; and a plurality of locking elements formed as radially projecting lugs arranged on said outer surface of said body and spaced from one another circumferentially and axially, said lugs being offset axially relative to one another so that a subsequent one of said lugs is aligned with a gap formed by two preceding ones of said lugs.

2. An anchor bolt as defined in claim 1, wherein said body has a rear end provided with a thread for fixing an article.

3. An anchor bolt as defined in claim 1, wherein said lugs have a slope which is inclined toward a rear end of said lugs.

4. An anchor bolt as defined in claim 1, wherein said lugs have edges performing a scraping action.

5. An anchor bolt for anchoring by a compound mass in a hole drilled in a component, comprising a body having an axis and an outer surface; and a plurality of locking elements formed as radially projecting lugs arranged on said outer surface of said body and spaced from one another circumferentially and axially, said lugs having a leading end face which forms a tapered point.

* * * * *